Sept. 20, 1966  F. G. LAMB  3,273,617
HIGH SPEED MECHANISM FOR SEGMENTING CRINKLE CUT VEGETABLES
Filed Jan. 24, 1964  4 Sheets-Sheet 1
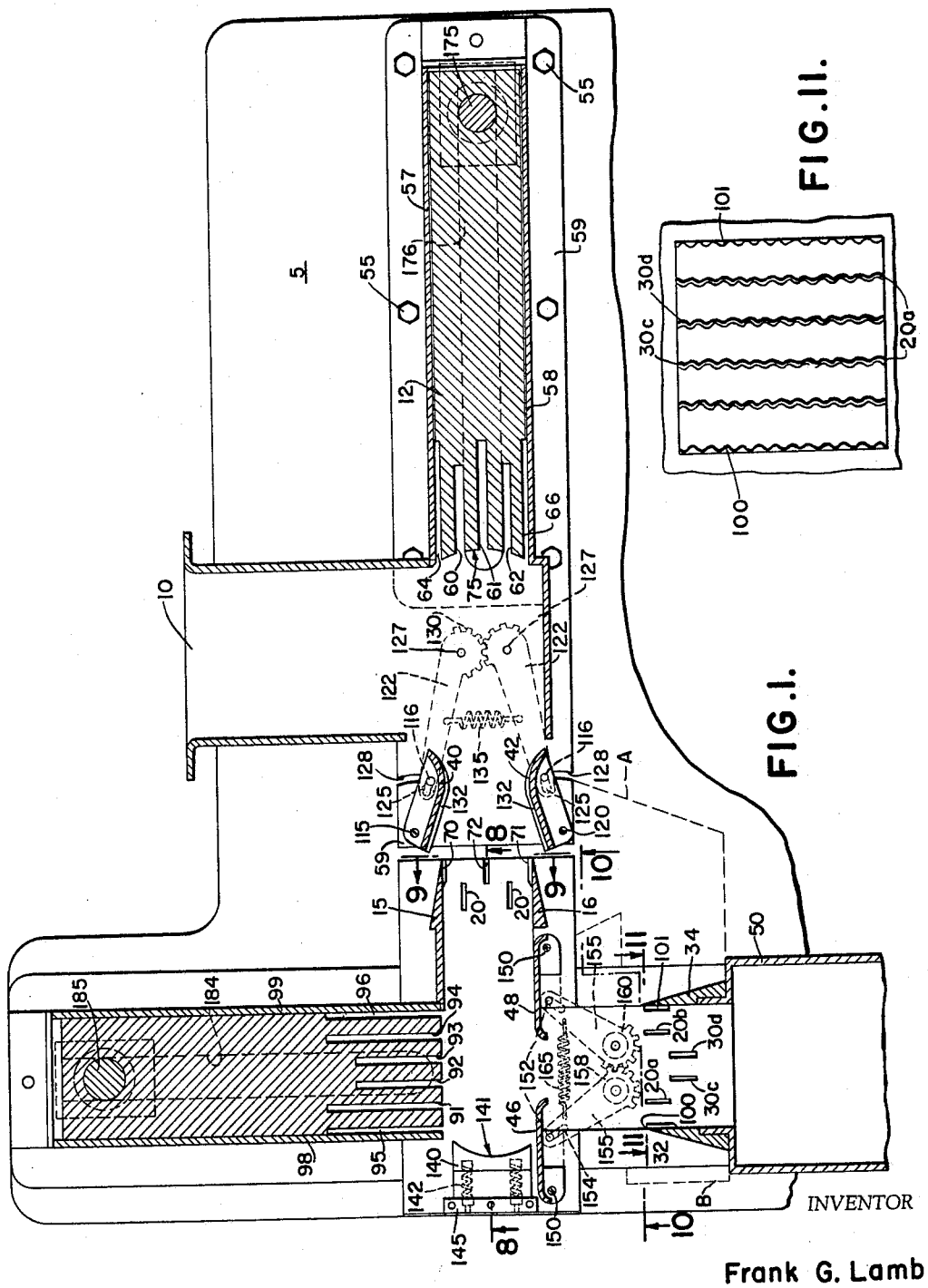
INVENTOR
Frank G. Lamb
BY Thomas, Weisman & Russell
ATTORNEYS

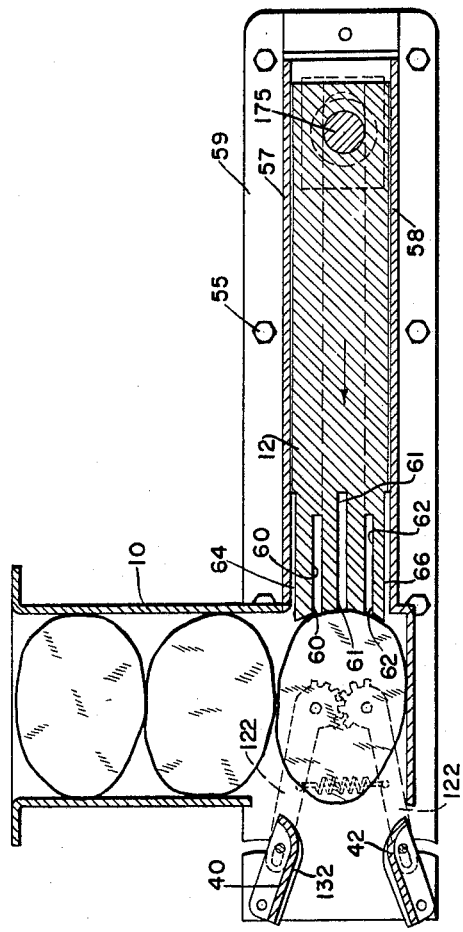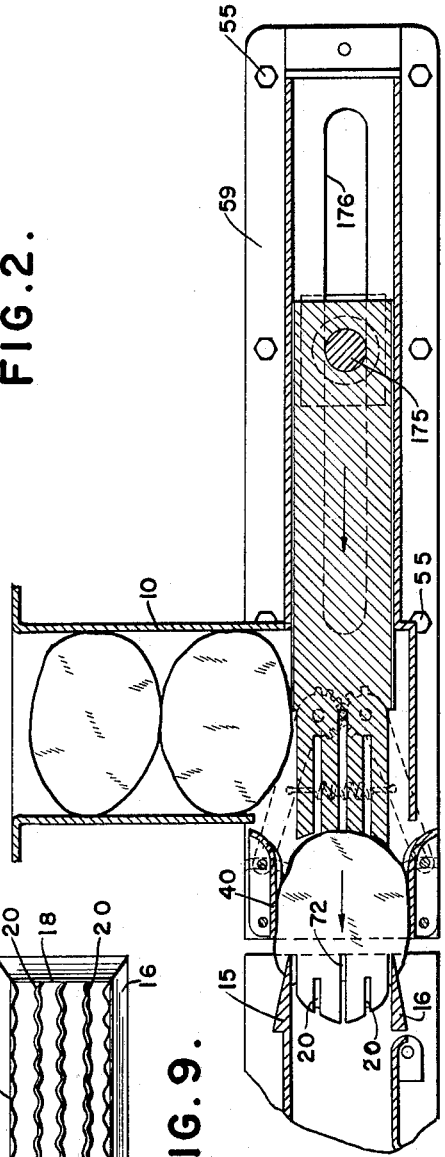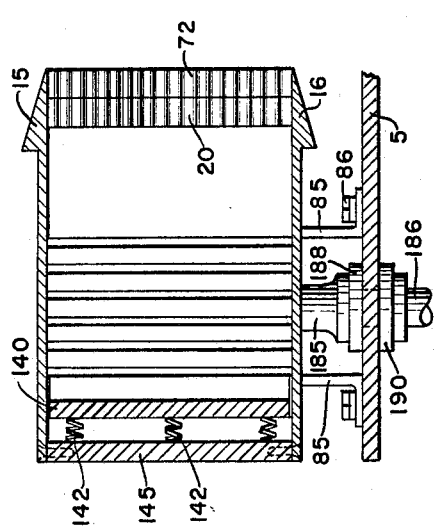

Sept. 20, 1966    F. G. LAMB    3,273,617
HIGH SPEED MECHANISM FOR SEGMENTING CRINKLE CUT VEGETABLES
Filed Jan. 24, 1964    4 Sheets-Sheet 3
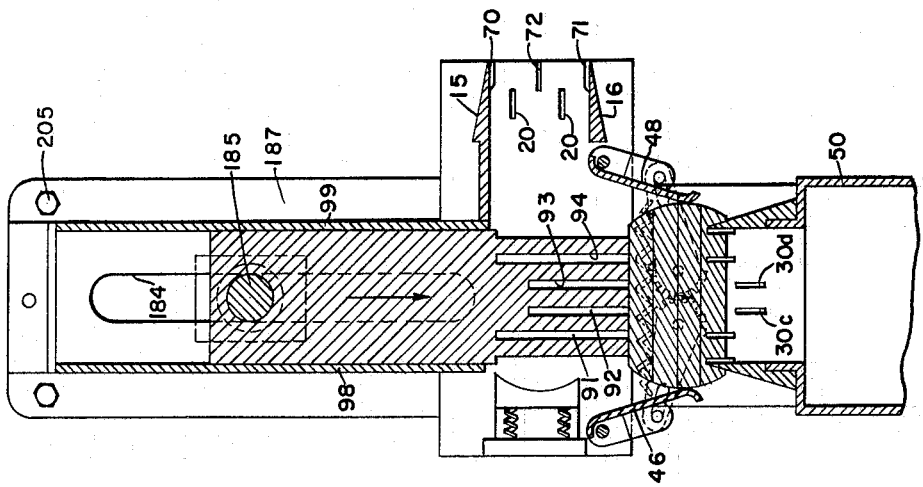
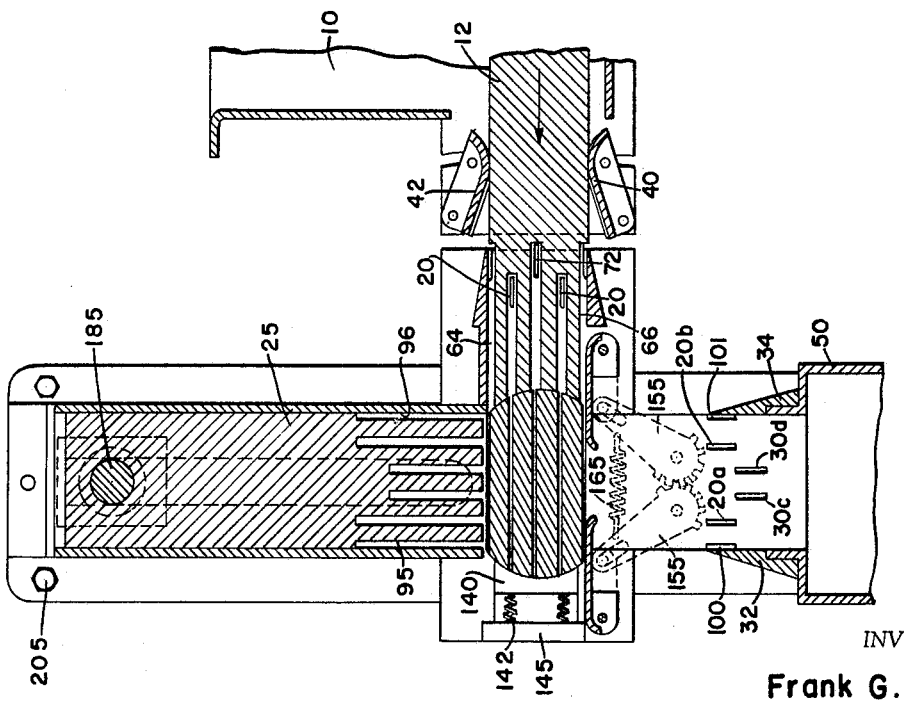
INVENTOR
Frank G. Lamb
BY Thomas, Weisman, & Russell
ATTORNEYS Sept. 20, 1966　　　　F. G. LAMB　　　　3,273,617
HIGH SPEED MECHANISM FOR SEGMENTING CRINKLE CUT VEGETABLES
Filed Jan. 24, 1964　　　　　　　　　　　　　4 Sheets-Sheet 4
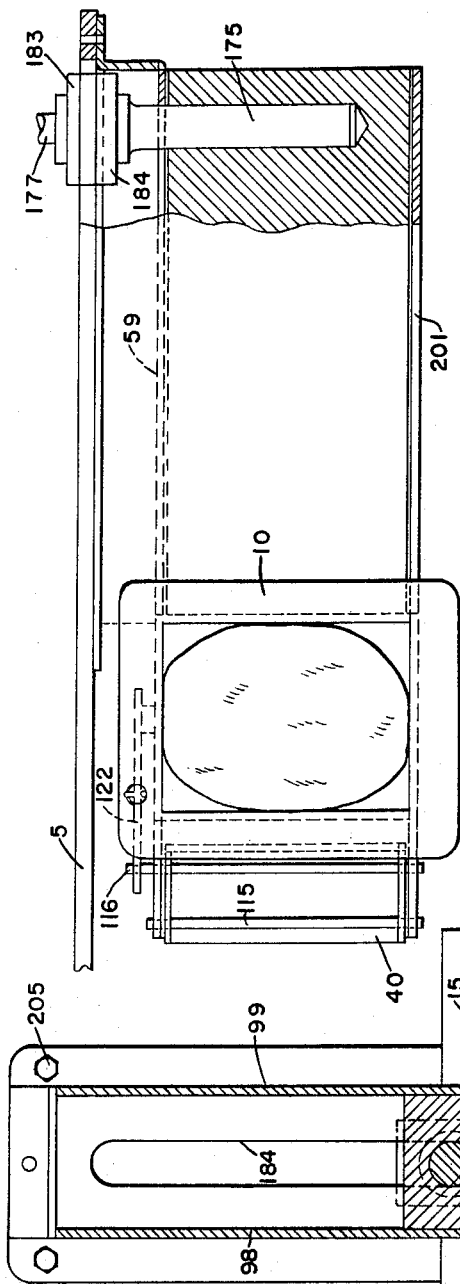
INVENTOR
Frank G. Lamb
BY Thomas, Weisman & Russell
ATTORNEYS

United States Patent Office 3,273,617
Patented Sept. 20, 1966

3,273,617
HIGH SPEED MECHANISM FOR SEGMENTING
CRINKLE CUT VEGETABLES
Frank G. Lamb, Lake Oswego, Oreg., assignor to Lamb-Weston, Inc., Portland, Oreg., a corporation of Oregon
Filed Jan. 24, 1964, Ser. No. 339,967
8 Claims. (Cl. 146—78)

This invention relates to a mechanism for high speed segmentation of vegetable products, particularly the potato, the means used resulting in a so-called "crinkle cut" portion, although of course it is contemplated the invention may be used with the employment of straight cutting blades so that the resultant product can take the form of either "diced" or the more usual type of "string" potatoes.

The instant application is a continuation-in-part of application of Frank G. Lamb, filed February 15, 1963, now Patent No. 3,217,768, and entitled "Mechanism for Preparation of Diced, String or Crinkle Cut Potatoes."

With respect to the identified patent, it is to be observed that the invention therein described and claimed has resulted in the production, in relatively large amount, and at substantial speed, of either string or crinkle cut potatoes. By reference to the aforesaid invention, it will be observed that the mechanism therein provided revolved about a concept wherein a given potato, having been slabbed, is pushed through each of the cutting assemblies by a following potato product, the latter being directly contacted by an appropriate propelling force, such as a reciprocating piston or plunger.

Although, as indicated, high speed performance has been obtained through the assembly of the invention described and claimed in the aforesaid parent application, further experimentation has indicated that the operation of this type of unit is appreciably and significantly improved, and the result bettered, by employing the design which is herein described. It has been found that where the cutting force is employed through an intervening potato product, i.e., the potato going through the knives is forced therethrough by a following potato, the first potato undergoing cutting is somewhat compressed, reflecting plunger pressure into the cutting blades themselves. As the plunger pressure is released the first potato, or that one being cut, exerts a slight hydrostatic knife pressure sideways, or laterally, on the knife blades. As the second potato is then propelled into the knives, it thus meets the knives in a slightly distorted position, such distortion being caused by the referred to hydrostatic pressure. This second product, upon being cut by such blades, then further distorts the same in a slight amount, for under the rapid operation here contemplated the knives do not have a chance to spring back to their normal parallel, or cutting position, between each time the product is fed to such knives. This accumulative distortion of the knives, it has been found, continues until, after a considerable number of potatoes have been cut, the knives exhibit incipient failure. Thus, although no one product will cause failure, a vast number in rapid succession, tend to do so, due to the fatcor which has just been described.

This phenomenon, stated as a possible explanation of failure of the cutting knives over a period of time, may be readily understood when, as indicated, it is considered that the involved operation is one of extremely high speed, this comment being pertinent particularly with respect to the production of either string or crinkle cut potatoes. As a conservative estimate of such speed of operation, it is visualized that the device of this invention will handle or segment into the desired shapes in excess of one hundred potatoes per minute. An average weight of such potatoes will probably run around 8 ounces apiece, the percentage of weight of the so-called "slabs" being not more than about 25%. With perfect efficiency of a mechanism of this nature, the result is that about 6 ounces of long, center cut crinkle cuts (if that be the desired end product) will result from each potato. Applying an efficiency factor of approximately 60%, it will thus be readily understood that a unit of this type is able to process approximately six and one-half tons of potatoes per hour.

Hence any increase in efficiency of such a unit, as by prolonging the life of the cutter blades, represents an economic factor of relatively tremendous importance, for blade replacement is a man-hour consuming operation, not to mention the involved expense consequent upon plant shutdown for the purpose of blade replacement.

In Patent No. 3,109,468 is described a blade arrangement wherein there are provided a series of blades located or positioned in different planes. There is also described in said patent the positioning of each cutting edge, or the angularity thereof with respect to the longitudinal axis along the center line of the cut. In other words, although the interior side of each cutting edge is disposed parallel to such longitudinal axis, in the preferred form the external side of such cutting edge is varied in this manner: the cutting edges of the blades nearer the stated longitudinal axis are less angled to the same than are the exterior sides of the blades positioned further away from the center axis. This results in a cutting operation whereby the several cuts are not compressed together, eliminating "binding" of the blades against the product, so that the cut is made with less difficulty, and with less chance of rupture or damage to the involved product, the result also being to permit an appreciably greater rate of production. Reference is here made to the aforesaid patent to emphasize that the blades of the instant invention, whether they be of the straight cut or crinkle cut type, are preferably disposed in his same relationship. The said relationship is not specifically shown in the drawings appended hereto but the disclosure of the referred to patent incorporated herein by reference as explanatory of the manner in which such blades should be mounted to obtain maximum efficiency.

The instant invention has as its main objective the provision of a means in the form of a slotted plunger which will assure positive plunger contact with the product being cut, eliminating the referred to procedure where the product is pushed through the several cutting implements by the force or thrust exerted thereupon by a following product. In this respect, deviation of or stress upon the several knife blades does not result in any appreciable distortion thereof, and the product being directly in contact with plunger pressure, the hydrostatic pressure or forces referred to above are completely eliminated.

Another object of the invention is the provision of a mechanism of this described type which requires only a two-cut operation. In the first cut the upper and lower side slabs and the two end slabs (here visualizing the product as a potato) are removed; in the same cut the product is slit lengthwise into, in the preferred form of the invention, at least four elongated segments, these segments representing the full length of the potato. In the second cut the two remaining side slabs are removed and a series of additional blades, four in number, further segment the product into twenty crinkle cut or sliced portions in this respect. The latter are taken upon the longest dimension of the potato. The operation requires only a two-plunger mechanism as contrasted with the invention of the referred to copending application Serial No. 258,822.

It is another objective of the invention to provide an assembly of the type generally referred to above wherein the entire operation is completely automatic, accomplished with extreme speed, and results in a complete "slabbing" of the potato, with the resultant portions being immediately discharged separately into appropriate water-carrying flumes so that such segmented portions from the time of the cutting operation are always under water as a further means of preservation of the product. This, of course, is of particular significance when the vegetables being processed are potatoes.

Another object of the invention is the simplification, to an extreme, of apparatus which will efficiently attain the foregoing advantages—the entire assembly can be mounted upon a single baseboard; blade removal and replacement is accomplished when necessary with great ease; the slabs when removed at the two different stages of the cutting operation are easily and separately discharged to further processing stages of the plant without interruption of the continuous production of the desired string, French or crinkle cut type of segment.

In addition to these particular advantages of the present invention, the same achieves the functions spelled out in more detail in the referred to Patent No. 3,217,768: provision of guide means for particularly the first cutting stage which assures appropriate centering of the product toward the cutter device so that impingement thereon is accurate and cutting into equal and predetermined lengths is possible; it is a basic advantage also that the mechanism of the invention permits of an ultimate product that represents only the most desirable portion of the vegetable—the center cut. Also, this being the case, each of the cuts are completely free of imperfections or undesirable skin portions which heretofore are normally present in kindred products now upon the market; and finally, the invention represents an assembly that requires only two basic although correlated moving elements—the two reciprocating plungers, which can be easily synchronized or coordinated by either mechanical linkages, electrical impulses as by solenoid operation, or hydraulic media of known form.

The invention will be described with reference to the accompanying drawings, wherein like figures represent like components of the assembly, and wherein:

FIGURE 1 is a section view of the invention, in elevation, illustrating the two plunger elements in retracted position and showing also the respective guide means for the first and second cutting stages;

FIGURE 2 is a section view, similar to FIGURE 1, illustrating the relative position of potatoes as charged to the hopper of the unit, and showing also the first plunger in contact with the lowermost potato and commencing its stroke toward the first stage of cutting elements;

FIGURE 3 is a section view similar to FIGURE 2 but showing the position of the plunger at about half-way through its entire stroke and indicating also the beginning cut of the first cutting stage;

FIGURE 4 is a section view of a portion of the assembly as shown in FIGURE 1, here illustrating only the first and second cutting stages but further showing the final position of the first plunger at the end of its stroke, as well as the position of the now partially slabbed and segmented potato ready for admission to the second cutting stage;

FIGURE 5 is a section view similar to that of FIGURE 4 but further illustrating the down stroke of the second plunger at about its mid-position and showing further the beginning of the cut being made upon the potato by the second cutting means;

FIGURE 6 is a section view similar to FIGURE 5, but here further illustrating the second slotted plunger in its full stroke position, with the potato now having been segmented into twenty portions and discharged into an appropriate water flume for further transport;

FIGURE 7 is a plan view, partially in section, of a portion of the assembly illustrating the manner by which the first thrust device or plunger is reciprocated, and also showing the lengthwise positioning of the product in the hopper;

FIGURE 8 is a section view taken on the line 8—8 of FIGURE 1;

FIGURE 9 is a section view taken on the line 9—9 of FIGURE 1;

FIGURE 10 is a section view taken on the line 10—10 of FIGURE 1; and

FIGURE 11 is a section view taken on the line 11—11 of FIGURE 1.

*General description of the invention*

The over-all arrangement of the invention is depicted in FIGURE 1, each of the two plungers being here shown in retracted position, and the several cutting stages (i.e., center cutters, side slab cutters and end cutters) all being illustrated.

All elements of the arrangement are shown as mounted upon a common base 5.

Potatoes are charged to the device through the hopper 10, which hopper is of greater length than width so as to accommodate a product of this general contour, and as indicated in FIGURE 2. By a suitable vibrating or shaker supply trough, the products have been aligned so as to fall into the hopper in the illustrated position, and at a relatively great rate of speed.

The slotted plunger 12 is adapted to reciprocate so as to sequentially press against a potato, as indicated in this same FIGURE 2, and thrust that potato against and through a series of cutting blades such as those shown at 20, the latter comprising in part the cutter arrangement of the first cutting stage.

The slotted and reciprocating plunger 12 has a stroke sufficient to position its contacting end past the cutting blades, such as the referred to blades 20, to come to rest, at the end of its stroke, at the position shown in FIGURE 4. Here it is seen the potato has been cut into four slabs or segments, with the external portions of that potato (two sides and two ends) being removed by four slab cutters 15, 16, and (FIGURE 9) cutters 17 and 18. The blades 15 and 16 remove the upper and lower sides of the potato, and the cutters 17 and 18 remove the two end slabs, it being noted that the potato is forced sidewise into this cutter arrangement.

Accordingly, in this position of the potato as it is shown in FIGURE 4, the product is ready for the second stage of the cutting procedure. In this position, then, two side slabs and two end slabs have been removed, leaving only the remaining two side slabs. These are now positioned to be removed during the next cutting stage.

A similar reciprocating and slotted plunger 25 performs the second cutting operation; as indicated in FIGURE 1 it is disposed at right angles to the position of plunger 12 and reciprocates in a vertical direction. As illustrated in FIGURE 1 this piston 25 is in its retracted position, the same position as shown in FIGURE 4, or in the position to immediately press the potato against the second series of cutting blades, such as those shown at 20a, 20b. The latter series are adapted to segment the potato into five additional strips or portions, these portions again representing the greater length of the potato.

There are two side slabs remaining on the potato; these are removed by the side slab cutting elements 32 and 34. By the time the potato has progressed through the several cutting elements (20a, 20b, 30c, 30d, 32 and 34), it has been cut into twenty crinkle cut pieces, and at the conclusion of the last cut such pieces are discharged into a water flume 50 for transport, under water, to other processing stages, such as cooking, freezing, dehydration procedures, etc.

Suitable guide means are provided immediately preceding the first cutting stage in order that the potato is properly centered for accurate impringement upon the first series of cutter blades. The guide means used just preceding the first cutting stage is represented by two curved flanges 40 and 42, such being appropriately contoured to approximate the shape of the product and pivoted so as to press against the top and bottom of the potato during its movement toward the cutter elements. These pivoted members bring pressure to bear upon each side of the potato end because of such pivot arrangement will function to exercise an appropriate guiding influence upon the product, irrespective of the comparative size of same within reasonable limitations.

Another type of guide means, positioned somewhat differently, and primarily utilized as a support for the segmented product after the first cutting procedure, is positioned immediately before the second cutting stage. This latter support and guide means consists of the opposed pivoted flanges 46 and 48, each of which is spring biased, as in the former case, to maintain them in the initial and slab supporting position as shown in FIGURES 1 and 4.

These two side supporting elements, 46, 48, are adapted to support the cut or segmented portions shown in FIGURE 4 until descent of the plunger 25. At that time the gates 46, 48 open or swing outwardly against the side of the potato as it descends to the second cutting stage or descends from the position shown in FIGURE 4 to that shown in FIGURES 5 and 6.

In each instance these respective elements 40–42 and 48–46 not only pivot sufficiently to accommodate the product and bring pressure to bear against each side of the same, thus centering the product, but likewise pivot outwardly sufficiently to permit the respective piston, either 12 or 25, to be received therebetween. Such operation is shown in FIGURE 4 with respect to plunger 12 where the two flanges 40 and 42 are resting against the upper and lower sides of the plunger; and with respect to plunger 25, and after the final cutting operation has been performed, the corresponding pivoted elements 46 and 48 are adapted to swing outwardly sufficiently to receive the corresponding sides of the plunger 25. Note in this respect the completion of the operation, or final cutting stage, as it is shown in FIGURE 6.

Suitable means are described in Patent No. 3,109,468 for removal of the slab portions, both side and end, and transporting them separately to other processing stages of a given plant operation. In the aforesaid patent separate flumes are described for this purpose and in the instant case separate flumes are also desirable. It has been explained that the center cut portions, either straight cut or crinkle cut, are discharged to a water flume 50 for further processing. At the same time, the slab portions which are removed at the initial cutting stage can be collected through the use of hopper or flume means as indicated in dotted line at A. Also, an additional hopper or flume means can be provided for separately collecting and discharging the side slabs cut in the second of the cutting stages by the slab cutters 32, 34. Such a general arrangement is only diagrammatically indicated in this instance, by dotted line, as shown at B (FIGURE 1). In both instances, it is clear that any one skilled n the art, having before him the instant disclosure, can devise a suitable flume or hopper arrangement for the reception and separate discharge of the side and end slabs removed in either or both of the referred to slab removing operations.

*Cutting stages of the assembly*

The plunger 12 is housed within a suitable housing comprised of top and bottom 57, 58 respectively, a rear wall 59 secured to the base 5, and an outer side wall 201 covering the plunger. This casing or raceway for the plunger is affixed to the base 5 through use of the usual bolts 55.

The plunger 12 is, of course, adapted to reciprocate within the described housing or raceway as shown in FIGURE 1. Such plunger or piston 12, in this embodiment of the invention, is provided at its contacting or outer end with a series of three slots, 60, 61 and 62, which are equally spaced from each other and which are adapted to accommodate the several cutting blades of the first cutting stage when the potato is pushed past such blades to be severed or segmented thereby. In the preferred embodiment of the invention such slots are about one-fifth of an inch wide, with the over-all dimension of the crinkle cut blades being about one-eight of an inch wide.

It is thus to be observed that each of these slots (60, 61 and 62) is of a proportion to receive the cutting blades of the first cutting action, even though such blades be of the corrugated type intended for performing a crinkle cut operation on the potato. In other words, the referred to slots are wide enough to receive the respective blades, which are adapted to fit therein with some tolerance, and despite the fact that the over-all thickness of a corrugated blade would be greater than that of a simple, straight edge knife. To this same end each of the upper and lower sides of the contacting portion of the plunger 12 is grooved or rabbeted, or reduced in section, as indicated at 64 and 66. There will thus be provided a small space between the respective upper members 57 and 58 and the end portion of the plunger. Such space, for a similar purpose, is provided to accommodate, for example, the corrugated blades used to remove the upper and lower slab portions of the potato. The plunger is of rectangular cross section, and the same type of slots, grooves, or reduced section is provided on each side thereof (as between the back plate 59 and the plunger) to accommodate the end slab cutters of the cutting mechanism, such end slab cutters being generally indicated (see FIGURE 9) at 17 and 18.

The first cutting stage comprises blades to perform seven cutting operations: two side slabs removed from each of the longitudinal sides of the potato, i.e., from top and bottom of the product as seen in FIGURE 2; two end slabs by blades 17 and 18; and three center cuts made by blades 20 and center blade 72.

The slab cutters for top and bottom are affixed to or formed integral with the blade supports 15 and 16 (top and bottom slab cutters), and the two end slab cutters are either made integral with or find their support in the elements 17 and 18 (FIGURE 9). The specific blades affixed to such members as 15 and 16 are shown in FIGURE 1 at 70 and 71, these blades removing the top and bottom slab portions in this vertical section drawing. Such blades 70 and 71, as stated, may be made integral with the supports 15 and 16 or attached thereto in any suitable fashion. The same can be said of the side slab cutters corresponding to the blade supports 17 and 18. The entire first cutting stage is supported upon stanchions 85, the latter being secured to base plate 5 through the usual bolts 86 (see FIGURE 8).

Insofar as the center cut be concerned, the first cut is made by the center blade 72 which is aligned along the center line of the plunger 12 and adapted to be received by the referred to slot 61 when such plunger is extended its full length. The two additional center cut blades, represented at 20, are disposed laterally or to one side of the center blade 72 and in a plane behind this first center cut blade, such arrangement being clearly disclosed in, e.g. FIGURES 1, 2 and 3. The blades 72 and 20 are of course positioned to coincide with slots 60 and 62 when the plunger is extended to its full length to achieve the multiple function of side slab removal and center cut segmentation. In like fashion, reduced sections 64 and 66 accommodate blades 70 and 71.

The plunger 12 is preferably curved upon its contacting face as generally indicated at 75, or convexed to appropriate somewhat the contour of the product when the same is positioned as shown in FIGURE 2, i.e., ready to be thrust against the cutting elements which have just been described. Such contour of the plunger 12 is of course provided so that as even a pressure as possible is applied throughout the curved space of the product as the cutting operation is performed.

Completion of the cut performed by this group of seven cutting elements is illustrated in FIGURE 4 where is clearly shown the penetration of the plunger 12 past the several cutting elements with blades 20 and 72 riding in the complementary and respective slots provided therefor, i.e., slots 60, 62 and 61. Similarly, the spaces upon each side of the plunger, represented by spaces produced by reduced sections 64 and 66, afford room for the plunger to pass through the upper and lower slab cutting elements which have just been described.

Again, as shown in FIGURE 4, the product is now positioned at that point where descent of the second plunger 25 will cause its traverse through the final series of blades comprising the second cutting stage. In other words, at this point the product has been "slabbed" with exception of two of the longitudinal side slabs, and the product has likewise been divided into four separate segments, such segments representing the over-all or greatest length of the potato.

The vertically disposed plunger 25 is similarly fabricated with a series of slots 91, 92, 93 and 94, each of which, in this order, are of sufficient width to receive the corrugated blades 20a, 20b, 30c and 30d when the referred to push rod 25 is extended the distance of maximum stroke, as depicted in FIGURE 6. Such plunger 25 is also made with an end portion of reduced size on two of its sides, thereby leaving spaces 95 and 96 between the end portion of the plunger and the two side walls 98 and 99 within which this thrust mechanism is disposed. The contact end of this element can be flat as the upper side of the product has now been slabbed.

As with plunger 12, the piston 25 is arranged to reciprocate within the referred to casing in such manner that upon the down stroke the product is pushed through the knives with some degree of exactness. In FIGURE 5 the plunger 25 is shown as having traversed approximately half of its stroke with the product commencing to impinge upon the knife edges 100, 101 (side slab cutters) and 20a, 20b, 30c, 30d (center cutters). In FIGURE 6 the plunger 25 has reached its position of maximum extension the product, here generally indicated at 40, now being segmented into twenty separate crinkle cut pieces.

Since two of the previous slab portions on the longitudinal sides and the two end portions have been removed during the first cutting procedure, it is necessary, in this second cutting stage, to remove the two remaining side slab portions, and this is accomplished by means of the referred to slab cutters or knife edges 100 and 101, mounted upon appropriate knife supports 32 and 34, the latter being affixed in any suitable manner to the flume 50. Such flume, as stated, receives the final and completed segmented product as such is shown in FIGURE 4 for transport to other processing stages.

The knives 20a, 20b, 30c and 30d, referred to in the foregoing, are mounted as indicated in FIGURES 1 and 4 to 6, with knives 20a and 20b being forwardly disposed substantially parallel to the line of travel of the plunger. Cutter elements 30c and 30d are disposed more adjacent to the center line of travel of the plunger 25 but rearwardly of the first pair or in a different plane than that of knives 20a and 20b. With a total of four center cut blades and two end slab cutters, it is thus seen that the second cutting stage involves a six-cut arrangement.

In each instance the respective plungers 12 and 25, being slotted in the manner described, exert a constant and even pressure upon the product being cut or segmented; this represents a substantial difference in operative procedure over that described in copending application Serial No. 258,822 where thrust to cut a given potato is obtained indirectly from the plunger mechanism, and directly from the thrust of a following product, with consequent ultimate blade impairment as discussed in the foregoing.

*The guide mechanism*

Reference to the several guides utilized for the purpose of assuring absolute centering of the product during the two-cutting stages has been made in the foregoing. Pivoted guides 40 and 42 are used with respect to the first stage; and a similar type of pivoted product support and guide, as at 46 and 48, is employed in the second cutting stage.

With respect to guide mechanisms 40 and 42, these take the form as shown in the drawings, with the inby end thereof being curved, and forming flanges 132, to approximate the shape of the product as it progresses to the first cutting stage. Each of these guides is pivoted at one end as at 115 and 120, and provided at the opposite end with a pin 116 riding in a suitable slot 128 formed in the base member 59. Each of the pins 125 are interconnected to an appropriate rack member 122, each of the pins 116 extending through approciate slots 125 formed in each of such rack members. These rack members are pivoted, as at 127, at the opposite ends thereof, and at such opposite ends are provided with intermeshing half pinions 130. The two rack members 122 are caused to seek the center line by an helical spring bias means 135 interconnecting the same end disposed intermediate the respective ends of such rack members.

Thus, in relatively closed position, the guides 40 and 42 remain in the position shown, e.g., in FIGURE 1. Upon the product being forced forwardly, as in FIGURE 3, toward the first cutting stage by the plunger 12, these guides are caused to separate the required extent, meanwhile exerting sufficient pressure upon the upper and lower sides of the product to accurately dispose the same along the center line. The centering function of this arrangement is further assured by the fact that neither of the guide members 40-42 can move in either direction, inwardly or outwardly, without a corresponding movement of the complementary guide member, due to the positive interlock therebetween found in the intermeshing half pinions 130.

It should further be understood that the referred to slots 125 permit this quarter rotation of each of the guide members, the pins 116 sliding in such slots from the position indicted in FIGURE 1 to the position indicated in FIGURE 3 when the guides are forced apart by the positioning of a product therebetween during the cutting procedure.

Also, as indicated above, whereas these guide members 40 and 42 are shown in the drawings in cross section, they are of a curved formation (when viewed frontally), and as indicated by flanges 132, so as to approximate the contour of the product and hence more efficiently perform the stated function.

The corresponding support mechanism found in elements 46 and 48 with respect to the second cutting stage performs in substantially the same manner but with a somewhat different additional purpose: positioned as shown in FIGURES 1 and 4 these guides 46 and 48 offer support for the product which has now been partially slabbed and segmented into four center cut pieces by the first cutting stage, i.e., support for the segmented product above the next cutting stage immediately after the first cut and prior to descent of the plunger 25.

Upon descent of the plunger these product support members are then forced apart permitting admission of the product to the second cutter stage. Thus the slabbed potato is maintained in position after the first cutting stage until descent of the vertical plunger.

As in the former instance, each of the product support members 46 and 48 are pivoted as at 150. A pivot pin 152 affixed to each, is arranged to ride in a complementary slot 154 formed in each of two adjacent, pivoted and intermeshing arms 155. These, as in the former case, are fitted with intermeshing half pinions 158 and are journaled upon a suitable pivot 160, in any appropriate fashion. Bias spring 165 is positioned between the arms 155 to urge the same toward each other, as in the former instance.

The operation of the described arrangement should be apparent from the above description—upon descent of plunger 25, the product progresses from the position shown in FIGURE 4 to that shown in FIGURE 5 where partial penetration of the several cutters is indicated. Upon completion of the stroke of plunger 25 the product has been completely pushed through the several cutting knives, with the end slabs removed. The guides or supports 46, 48 have swung open to permit this operation. Twenty corrugated or crinkle cut segments remain, as indicated in FIGURE 6, such segments being discharged into the referred to flume 50.

In the preferred embodiment of the invention, a corrugated knife blade is used in each instance, as indicated in FIGURE 11, with the slab cutters, in all instances, being corrugated to form the individual segments with crinkled formations on each of the respective four sides thereof.

A curved bumper plate is also provided with respect to this second cutting stage assembly. This is found in the element 140 (see FIGURES 1 and 8), the facing surface of which is convexed as indicated at 141 to approximately fit the side contour of a given product, such as a potato. This cushioned element 140 is mounted upon a plurality of spring members 142 in the manner shown, such spring members seated in appropriate bores in the element 140, and corresponding bores at their opposite ends, formed in the base member 145. The latter is affixed to the opposed cutter supports (15 and 16, FIGURE 8) in any suitable fashion.

The purpose of this bumper plate or cushion element 140 is, as its name implies, to cushion the effect when a product is forced through the first cutting stage with comparatively great velocity and sufficient thrust to effectuate segmentation. The resiliency of the element prevents injury to the product, and further, such element provides a centering device in the sense that the product is stopped at contact with element 140 and the main portion thereof accurately positioned underneath the plunger 25 in readiness for the following downward stroke thereof to effectuate the second cutting cycle.

*Plunger drive means*

It should of course be apparent that plungers 12 and 25 are synchronized so that the latter is withdrawn to the position shown in FIGURE 4 while plunger 12 is extended to the position therein indicated. In such latter position, the product is ready for the second cut.

Any timing means used to achieve such synchronization is so constructed and the motivating force so arranged that prior to the downward stroke of plunger 25, plunger 12 is appreciably withdrawn from the position indicated in that figure (FIGURE 4). In the preferred embodiment of the invention, however, the first stroke of plunger 12 still does not place that element under or in the direction of travel of the vertical thrust mechanism, the full stroke position of plunger 12 being as indicated. Thus even in that position the plunger 25 can commence the down stroke without impingement upon the forward end of the plunger of the first stage. However, it is preferred at this point of the mechanical action that the timing of the plunger be such that it has been retracted somewhat from the position shown in FIGURE 4 prior to further descent of plunger 25. This will further preclude the possibility of damage, during cutting, to the product.

Any type of means can be employed to reciprocate these two thrust mechanisms in timed relationship. For example, an electrically operated solenoid means may be used, the respective plungers being reciprocated in response to an appropriate, timed signal, each solenoid being suitably interconnected with each plunger. Alternatively, an hydraulic arrangement may be used; here hydraulic rams can be automatically extended and retracted by means well within the knowledge of those skilled in the art.

In the cited copending application, Serial No. 258,822, a mechanical arrangement is illustrated which represents the utmost of simplicity. Such a linkage assembly can be used as the means to extend and retract each of the plungers in the respective first and second stage of cutting operations. In the referred to case, there are three cutting stages; in the instant improvement only two cutting stages are employed. Hence the linkage arrangement of the said copending case with respect to the first two stages and as there described and illustrated can be duplicated here for that same purpose—reciprocation of the two plungers in timed relationship, all mechanically done through rotation of a single power shaft. A drive means of this sort is capable of being operated at comparatively high rates of speed, and without extreme vibration, so that rapid production of the order hereinbefore indicated is readily obtainable.

The arrangement of the two slotted plungers 12 and 25 of the instant invention is comparable to the arrangement of the two pistons in the first two cutting stages of the referred to copending case.

Thus here, and referring to the horizontally reciprocating member 12, such plunger is driven by a suitable drive rod 175, arranged to be reciprocated through an elongated slot 176 in base member 59 and a corresponding slot in base member 5. The opposite side of the rod is extended and such extension 177 is placed in interconnection with the appropriate linkage of the rotary shaft system to assure reciprocation of this thrust mechanism in timed relationship.

Similarly, the vertical thrust mechanism or plunger 25 is also driven through an interconnecting drive rod 185 adapted to reciprocate through a slot 184 of comparable size, and formed in base member 5. Referring to FIGURE 8, it is seen that this drive rod has an extension 186 which is also adapted to be interconnected with the rotary drive mechanism and accompanying linkage, as illustrated and described in the aforesaid copending case.

In each instance, and with respect to both plungers 12 and 25, suitable bearing bushings, such as those shown at 188, 190 (FIGURE 8) and 183, 184 (FIGURE 7), placed upon each side of the respective slotted base member, maintain the respective drive shafts (175, 185) in slidable relationship with the corresponding elongated slots (176 or 184) so that the reciprocations of such plungers are even and accomplished without substantial deviation from the desired path.

In the respect just mentioned, it should further be observed that accuracy of reciprocations of the two plungers 12 and 25, i.e., application of repeated thrust, is obtained within a very fine tolerance due to the fact that each plunger is encased in an appropriate raceway or housing that precludes substantial deviation either vertically or laterally during rapid reciprocation of these elements. The raceway for plunger 12 may be visualized as being comprised of upper and lower housings 57 and 58 and back and front plates 59 and 201 respectively (FIGURE 7). The raceway for plunger 25 is found in the opposed housing members 98 and 99, secured to base member 5 as by bolts 205. The latter plunger element is further encased by a front housing plate (not shown), and in the rear, by the base member 5 which is slotted, and which also bears directly against the rear face of that plunger. Proper and precise reciprocation without substantial deviation is thus obtainable. Such is a requirement in the present instance, for the slots in the forward ends of each plunger must be at all times properly aligned with the several cutting elements in order that each plunger can progress past such elements without contact therewith and in unrestricted fashion.

From the foregoing detailed description of the invention, the operation thereof should be readily apparent. The main advantage of this novel arrangement is, as recited in the foregoing, the accomplishment of high speed operation without perceptible damage to the product being processed and without, over a considerable period of time, appreciable damage to either series of cutter blades. The novel concept is fulfilled through the use of slotted push rods or plungers which directly contact the involved product, forcing it through the two cutting stages. By use of such a slotted plunger arrangement, wherein direct thrust is applied, the deterioration of the involved cutter blades over a period of prolonged use is fully eliminated, resultant upon a complete absence of such hydrostatic pressure as will have the tendency to distort the knives and hence require replacement, as I have outlined this in the foregoing.

In addition, the instant improvement contemplates the obtaining of the longest possible cut from a given product generally having a greater length than width, for example, the potato, and yet achieves this objective even with respect to slices of the crinkle cut type. Only center cuts are produced as the desired end product, thus eliminating the more imperfect portions of the tuber as represented by the slab portions which, in the operation of this mechanism, are removed at the same time as the center cuts are formed. In other words, the ultimate product represents center cuts of full dimension with practically a complete absence of slivers, imperfections, or otherwise malformed pieces.

In the use of the beveled knife concept as the same is presented in the aforementioned Lamb et al. Patent No. 3,109,468, is found an additional factor contributing to longevity of the involved knife edges, and perhaps even more important, in the angled positioning of the knife edges in the stated manner, is found an answer to the problem of damage to the tuber. With such critical positioning (either of the straight edge or crinkle cut type) of blade, it is possible to make the cut clean and without any binding effect due to compression of the potato against the sides of the knife. As a practical consequence, extremely high speed operation without undue vibratory effect is attainable.

The foregoing represents the preferred embodiment of the invention. However, my invention is not deemed to be confined in scope in any material way except as by those limitations which are present in the claims appended hereto.

I claim:

1. In a high speed vegetable cutting mechanism for continuously and sequentially segmenting a vegetable product into center cut portions, the combination comprising: a first series of cutting elements mounted in one direction for removal of all but two slabs of said product and for segmenting said product into a plurality of center segments, a second series of cutting elements mounted in a direction at right angles to said one direction to remove said two slabs and for segmenting said slabs into a plurality of elongated center cuts, the segmenting cutting elements of each of said first and second series being mounted in at least two different planes with respect to said one direction and said direction at right angles, respectively, and a means for each stage to push said product therethrough, said means comprising a reciprocating plunger having slots in the product-contacting end thereof to accommodate said cutting elements, and means for separately discharging said slabs and said center cuts.

2. The invention as defined in claim 1 wherein each of said cutting elements comprises straight edge cutters for producing flat surfaced slices.

3. The invention as defined in claim 1 wherein each of said cutting elements comprises corrugated edge cutters for producing crinkle cut slices.

4. In a mechanism for continuously and sequentially slabbing and cutting a vegetable product into elongated center cut portions, a first horizontally disposed plunger having slots at one end to receive product cutting knives, a first cutting series comprising side and end slab cutters and center cut knives adjacent thereto, guide means disposed in front of said slab cutters to guide said product to said side and end slab cutters and knives, means to extend and retract said plunger to sequentially push a plurality of said products through said side and end slab cutters and knives to partially slab and segment said products, a second vertically disposed plunger having slots at one end to receive a second cutting series, said second cutting series comprising side slab cutters and center cut knives to completely slab and further segment said products, said first plunger sequentially placing said partially segmented products under said second plunger, and means to extend and retract said second plunger to sequentially push said plurality of products through said second cutting series, whereby said products are sequentially completely slabbed and segmented into said elongated center cut portions.

5. The invention as defined in claim 4 wherein a support means is disposed intermediate said second plunger and said second cutting series to support said side slabbed and partially segmented products prior to extension of said second plunger to completely slab and center cut said products.

6. The invention as defined in claim 5 wherein the knives of said first and second cutting series are of corrugated shape to produce crinkle cut elongated slices.

7. The invention as defined in claim 4 wherein said center cut knives of each of said series are corrugated to produce crinkle cut slices.

8. The invention as defined in claim 4 wherein all of said slab cutters and center cut knives of said first and second cutting series are corrugated to produce corrugated edges upon all sides of said elongated center cut portions.

References Cited by the Examiner

UNITED STATES PATENTS

| | | | |
|---|---|---|---|
| 690,512 | 1/1902 | Boos | 146—169 |
| 2,291,449 | 7/1942 | Burgess et al. | 146—169 |
| 2,303,595 | 12/1942 | Young | 146—78 |
| 2,677,403 | 5/1954 | Brown et al. | 146—78 |
| 3,057,386 | 10/1962 | Massaro | 146—78 |
| 3,109,468 | 11/1963 | Lamb et al. | 146—78 |

ROBERT C. RIORDON, *Primary Examiner.*

WILLIE G. ABERCROMBIE, *Examiner.*